(12) United States Patent
Takei

(10) Patent No.: US 10,153,824 B2
(45) Date of Patent: Dec. 11, 2018

(54) WIRELESS COMMUNICATION SYSTEM AND SYSTEM USING SAME

(71) Applicant: Hitachi, Ltd., Chiyoda-ku, Tokyo (JP)

(72) Inventor: Ken Takei, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 49 days.

(21) Appl. No.: 15/526,189

(22) PCT Filed: Nov. 13, 2014

(86) PCT No.: PCT/JP2014/080032
§ 371 (c)(1),
(2) Date: May 11, 2017

(87) PCT Pub. No.: WO2016/075785
PCT Pub. Date: May 19, 2016

(65) Prior Publication Data
US 2017/0310379 A1   Oct. 26, 2017

(51) Int. Cl.
*H04B 7/10* (2017.01)
*H04W 56/00* (2009.01)

(52) U.S. Cl.
CPC ............ *H04B 7/10* (2013.01); *H04W 56/001* (2013.01)

(58) Field of Classification Search
CPC ...... H04B 7/10; H04W 56/001; H04J 3/0605; H04J 3/0682; H04L 9/0819; H04L 9/12
See application file for complete search history.

(56) References Cited

U.S. PATENT DOCUMENTS

| 6,061,020 A | 5/2000 | Ishijima et al. |
| 6,204,810 B1 * | 3/2001 | Smith ............... H04B 7/10 342/361 |

(Continued)

FOREIGN PATENT DOCUMENTS

| JP | 10-135919 A | 5/1998 |
| JP | 2006-254112 | 9/2006 |
| WO | WO 2012/120657 A1 | 9/2012 |

OTHER PUBLICATIONS

International Search Report (PCT/ISA/210) issued in PCT Application No. PCT/JP2014/080032 dated Feb. 10, 2015 with English translation (four (4) pages).

(Continued)

*Primary Examiner* — Wutchung Chu
(74) *Attorney, Agent, or Firm* — Crowell & Moring LLP

(57) ABSTRACT

Provided is a wireless communication system that achieves high-reliability communication between a transmitter and a receiver. Specifically, the wireless communication system includes: a transmitter that transmits a carrier wave with rotational polarization on which a strongly correlated code is superimposed; and a receiver that uses the strongly correlated code in the reception polarized wave from the transmitter to establish synchronization between the transmitter and the receiver, wherein the receiver receives signals in a plurality of different polarized waves, establishes synchronization between the transmitter and the receiver for the plurality of reception polarized waves using correlation values between the received signals and the strongly correlated code corresponding to the reception polarized waves, compares the correlation values to a threshold to extract a specific reception polarized wave and a received signal corresponding to the polarized wave, calculates transmission polarization angles from shifts in synchronization timing, and separates or selects the signals transmitted in different (Continued)

propagation paths using specific reception polarized waves corresponding to the plurality of transmission polarization angles and the received signals corresponding to the polarized waves.

22 Claims, 10 Drawing Sheets

(56) References Cited

U.S. PATENT DOCUMENTS

| | | | | |
|---|---|---|---|---|
| 9,407,349 B2* | 8/2016 | Takei | ............... | H04B 7/10 |
| 2001/0003442 A1* | 6/2001 | Smith | ............... | H04B 7/10 |
| | | | | 342/365 |
| 2002/0181439 A1* | 12/2002 | Orihashi | ............... | H04J 3/0605 |
| | | | | 370/350 |
| 2003/0103771 A1* | 6/2003 | Atmur | ............... | H04J 14/06 |
| | | | | 398/152 |
| 2003/0162566 A1* | 8/2003 | Shapira | ............... | H01Q 1/246 |
| | | | | 455/561 |
| 2004/0104843 A1* | 6/2004 | Mimura | ............... | G01R 29/0892 |
| | | | | 342/362 |
| 2004/0264592 A1* | 12/2004 | Sibecas | ............... | H01Q 21/24 |
| | | | | 375/267 |
| 2005/0123138 A1* | 6/2005 | Abe | ............... | H04B 1/7113 |
| | | | | 380/255 |
| 2005/0141594 A1* | 6/2005 | Smith | ............... | H04B 1/692 |
| | | | | 375/130 |
| 2006/0229031 A1 | 10/2006 | Washiro | | |
| 2007/0047678 A1* | 3/2007 | Sibecas | ............... | H04B 1/7115 |
| | | | | 375/343 |
| 2010/0001904 A1* | 1/2010 | Iwamatsu | ............... | H01Q 3/2611 |
| | | | | 342/372 |
| 2010/0135445 A1* | 6/2010 | Sari | ............... | H04B 7/0413 |
| | | | | 375/347 |
| 2011/0007758 A1* | 1/2011 | Macrae | ............... | H04B 7/10 |
| | | | | 370/480 |
| 2011/0019630 A1* | 1/2011 | Harris | ............... | H03D 3/02 |
| | | | | 370/329 |
| 2013/0107991 A1* | 5/2013 | Hinson | ............... | H01Q 19/30 |
| | | | | 375/340 |
| 2013/0336417 A1* | 12/2013 | Takei | ............... | H04B 7/10 |
| | | | | 375/267 |
| 2016/0182185 A1* | 6/2016 | Takei | ............... | H04L 27/0002 |
| | | | | 455/42 |
| 2016/0255499 A1* | 9/2016 | Takei | ............... | H04K 1/08 |
| | | | | 455/410 |
| 2018/0019835 A1* | 1/2018 | Kamiya | ............... | H04B 7/0871 |
| 2018/0191446 A1* | 7/2018 | Blanks | ............... | G02B 27/283 |

OTHER PUBLICATIONS

Japanese-language Written Opinion (PCT/ISA/237) issued in PCT Application No. PCT/JP2014/080032 dated Feb. 10, 2015 (three (3) pages).

Takei, K., "Polarization angle diversity for highly-reliable machine-to-machine radio," 2013 International Conference on Circuits, Power and Computing Technologies (ICC PCT-2013), IEEE, Mar. 21, 2013, p. 825-828 (four (4) pages).

* cited by examiner

TRANSMITTER T

RECEIVER R

WIRELESS COMMUNICATION SYSTEM AND SYSTEM USING SAME

TECHNICAL FIELD

The present invention relates to a wireless communication system using wireless devices implementing high-reliability wireless communication and a utilization system thereof. More specifically, the present invention relates to a wireless communication system in which there are obstacles reflecting and scattering radio waves in the environment where the wireless devices are placed, multiple waves generated by the obstacles are used to form a plurality of identifiable wireless transmission paths between transmission and reception points, and information can be transmitted in the wireless transmission paths at high yield ratios, and a utilization system thereof.

BACKGROUND ART

In order to achieve industries enabling sustained growth, there is a social demand for a new energy generation and distribution system that satisfies both higher efficiency in energy consumption and reduction of industrial waste. Aimed at such energy generation and distribution, new energy-communication integrated networks are being built around the world.

The energy-communication integrated network is intended to connect various devices involved in generation, distribution, and consumption of energy over the network to share information on the operation status of the devices and surrounding environments among all or specific ones of the devices, and control the operation status of the devices connected over the network using the information to optimize the performance of all the network-connected devices on the whole.

The devices to be connected for establishment of the network are very large in number. Therefore, the use of a wireless network is expected to reduce the introduction cost and maintenance cost of the network.

The wireless network can be expected to decrease its introduction and maintenance costs, but data flowing on the network is subjected to external noise and disturbance waves due to the physical properties of electromagnetic waves as a transmission medium of wireless communication. It is thus difficult to ensure reliability of control and monitoring information on the various devices using the data.

In particular, when the various devices connected over the energy-communication integrated network generate and distribute resources directly linked to ordinary citizens' life such as electric power, water, and gas, the degradation and loss of the data would inevitably cause heavy damage to civilian life. The problem of difficulty in ensuring reliability of control and monitoring information on the various devices is definitely to be solved to implement the energy-communication integrated network by wireless technology.

In wireless communications, the various devices existing between the communication transmission and reception points act as electromagnetic wave scatterers. Therefore, communications are carried out through a plurality of different paths from the transmission point to the reception point via a plurality of multiple reflection propagation paths caused by reflection from the various devices. The plurality of paths caused by multiple reflection is specific to the transmission and reception points. A signal from the transmission point reaches any spatial point other than the transmission and reception points through a path different from the plurality of paths from the transmission point to the reception point, and a signal generated from the other spatial point reaches the reception point through a path different from the plurality of paths from the transmission point to the reception point.

Therefore, selecting or combining the plurality of paths from the transmission point to the reception point may allow transmission of information that could not be acquired at other spatial points between the transmission and reception points. PTL 1 describes a background technique based on such a principle. According to the technique in PTL 1, an information signal to be transmitted is digitized, a balanced modulator and two orthogonal antennas are used for a transmitter, and data is transmitted with two polarization states of rotation/fixation in correspondence with the digital signal. In addition, PTL 2 describes that two lines of data are generated based on an information signal to be transmitted, and are transmitted by rotational polarization in different rotating directions.

CITATION LIST

Patent Literature

PTL 1: JP-A 10-135919
PTL 2: JP-A 2006-254112

SUMMARY OF INVENTION

Technical Problem

According to these background techniques, to handle noise and interference to which the signal being transmitted between the transmitter and the receiver is subjected, the disturbance to a polarized wave is avoided in the former technique, and the disturbance to two different polarized waves is reduced as compared to a single polarized wave in the latter technique, thereby achieving enhancement in reliability between the transmitter and the receiver.

In the both techniques, communications are carried out in a plurality of propagation paths existing between the transmitter and the receiver collectively as one transmission path, and therefore individual noises and interferences caused to signals in a plurality of different places between the transmitter and the receiver cannot be handled, which results in a problem with reliability of communications between the transmitter and the receiver.

In view of the foregoing circumstances, an object of the present invention for solving the problem is to provide a wireless communication system that, in a radio wave environment where there exists a plurality of electromagnetic wave scatterers between a transmitter and a receiver and electromagnetic waves emitted from the transmitter are subjected to multiple reflection by the scatterers and the electromagnetic waves interfere with each other and reach the receiver, removes or reduces noises and disturbances caused to the signals in a plurality of different places between the transmitter and the receiver to implement high-reliability communications between the transmitter and the receiver, and a utilization system thereof.

Solution to Problem

Therefore, in the present invention, a wireless communication system includes: a transmitter that transmits a carrier wave with rotational polarization on which a strongly correlated code is superimposed; and a receiver that uses the strongly correlated code in the reception polarized wave from the transmitter to establish synchronization between the transmitter and the receiver, wherein the receiver receives signals in a plurality of different polarized waves, establishes synchronization between the transmitter and the receiver for the plurality of reception polarized waves using correlation values between the received signals and the strongly correlated code corresponding to the reception polarized waves, compares the correlation values to a threshold to extract a specific reception polarized wave and a received signal corresponding to the polarized wave, calculates transmission polarization angles from shifts in synchronization timing, and separates or selects the signals transmitted in different propagation paths using specific reception polarized waves corresponding to the plurality of transmission polarization angles and the received signals corresponding to the polarized waves.

Advantageous Effects of Invention

According to the present invention, in a radio wave environment where there exists a plurality of electromagnetic wave scatterers between a transmitter and a receiver and electromagnetic waves emitted from the transmitter are subjected to multiple reflection by the scatterers and the electromagnetic waves interfere with each other and reach the receiver, it is possible to achieve a plurality of transmission paths changing from moment to moment between the transmitter and the receiver, select or synthesize with weighting signals reaching the receiver through the plurality of transmission paths to reconstruct information included in the signals with high reliability, thereby implementing high-reliability wireless communication.

DESCRIPTION OF EMBODIMENTS

Examples of the present invention are hereinafter described with reference to FIGS. 1 through 12.

Example 1

In relation to Example 1, descriptions are given as to a configuration example of a wireless communication system that removes or reduces noises and disturbances caused to signals in a plurality of places between a transmitter and a receiver to implement high-reliability communications between the transmitter and the receiver.

Figure 2:
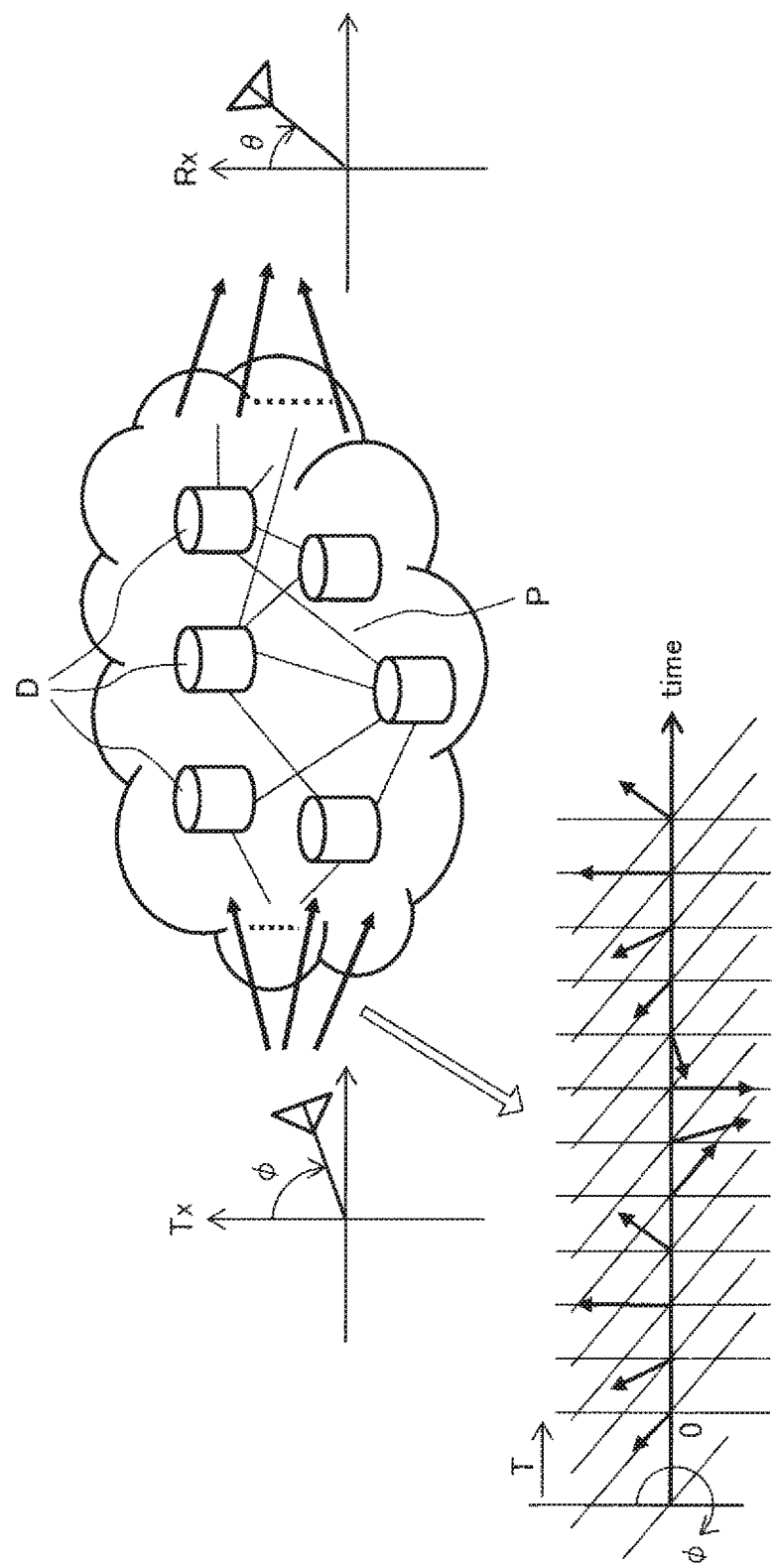
FIG. 2 is a diagram illustrating an example of communications in an environment including obstacles reflecting and scattering radio waves.

FIG. 2 is a diagram illustrating an example of communications in an environment including obstacles reflecting and scattering radio waves. In this example, various devices D existing between communication transmission and reception points (transmission point TX and reception point RX) act as electromagnetic wave scatterers, and communications are carried out through a plurality of different paths P from the transmission point TX to the reception point RX via a plurality of multiple reflection propagation paths caused by reflection from the various devices D. In addition, in this example, rotational polarization communications are carried out and two each 90-degree orthogonal antennas are included at the transmission point TX and the reception point RX. The rotational polarization communications are radio wave communications in which a polarized wave rotates in a direction orthogonal to a traveling direction at arbitrary frequencies equal to or lower than a carrier wave frequency. The rotational polarized wave has a plane of rotational polarization as illustrated in the drawing, and the plane of polarization changes in phase with the passage of time T. Accordingly, in general, the phase at the transmission point (transmission-side phase φ) and the phase at the reception point (reception-side phase θ) are different.

Figure 1:
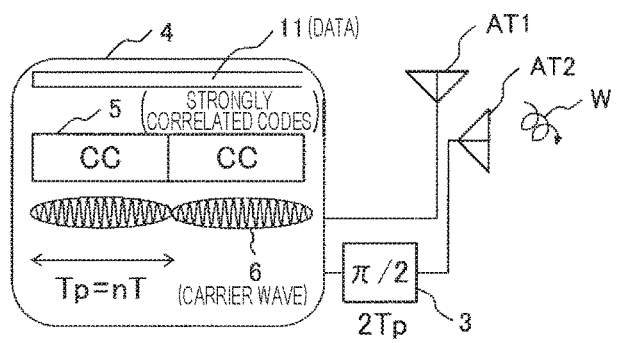
FIG. 1 is a diagram illustrating a configuration example of a wireless communication system according to Example 1.
Figure 1:
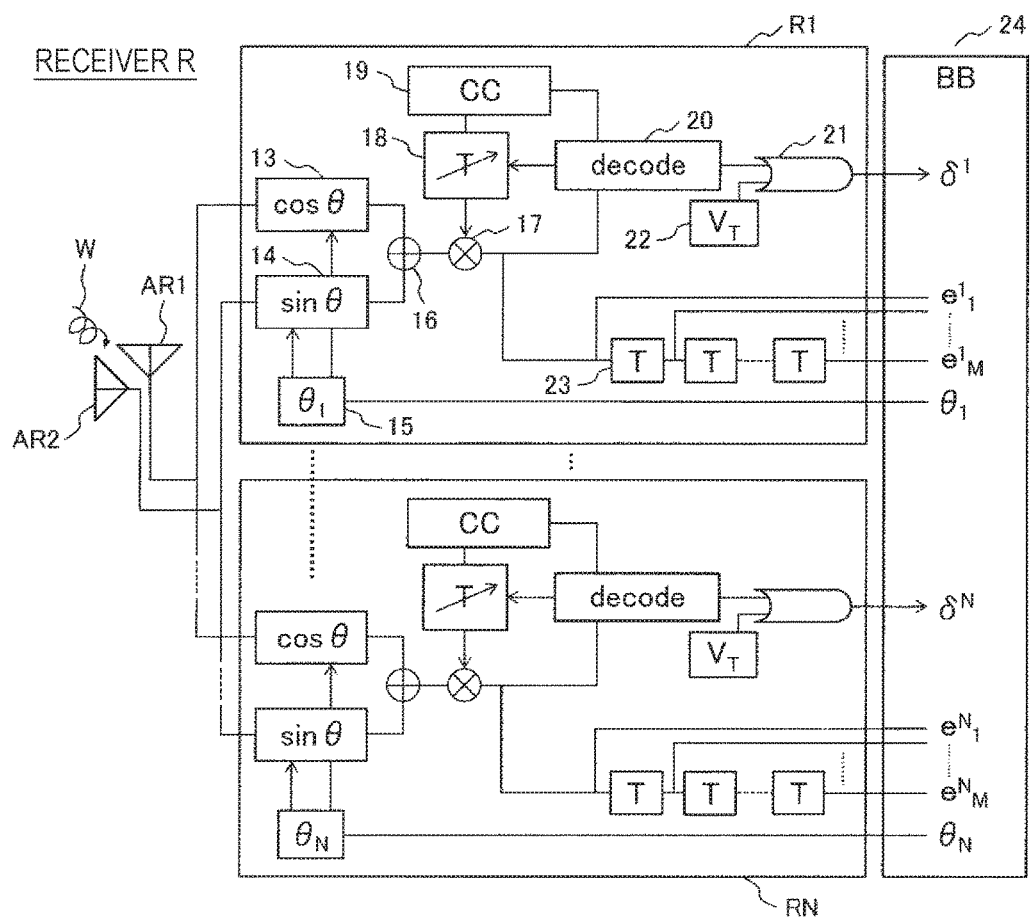

FIG. 1 is a diagram illustrating a configuration example of the wireless communication system according to Example 1. The wireless communication system of Example 1 is intended to remove or reduce noises and disturbances caused to signals in a plurality of places between the transmitter and the receiver to implement high-reliability communications between the transmitter and the receiver.

In the wireless communication system of FIG. 1, the rotational polarization communication is employed. Accordingly, two each 90 degree-orthogonal antennas are included in a transmitter T and a receiver R. Antennas AT1 and AT2 on the transmitter T side are orthogonal to each other, and antennas AR1 and AR2 on the receiver R side are orthogonal to each other. A transmitted radio wave W is a rotational polarized wave that has a plane of polarization rotating and changing in phase with the passage of time T as illustrated in FIG. 2.

To implement the rotational polarization transmission, on the transmitter T side, a transmitted signal to form a beat by two signals of different frequencies generated by a digital signal processing device 4 is given to one transmission antenna AT1 and the same transmitted signal is given to the other transmission antenna AT2 through a beat frequency 90-degree phase shift circuit 3.

The digital signal processing device 4 in the transmitter T includes a strongly correlated code generator 5, a beat waveform generator 6 with two frequency components, and a digital data generation circuit 11. In this example, a signal generated by the digital data generation circuit 11 is superimposed on a strongly correlated code generated by the strongly correlated code generator 5 to modulate a carrier wave signal generated by the beat waveform generator 6.

The digital signal processing device 4 outputs a modulated signal (output of the beat waveform generator 6) in two systems. As a radio wave, one of the lines is emitted as a radio wave into the space directly from the first transmission antenna AT1 and the other is emitted into the space from the second transmission antenna AT2 via the 90-degree phase shift circuit 3. The emitted radio wave reaches the receiver R with the polarized wave rotating at the beat frequency.

The receiver R receives the radio wave emitted from the transmitter T by the first reception antenna AR1 and the second reception antenna AR2 that are orthogonal to each other. In this case, the reception of the radio wave is obtained through the plurality of different paths P from the transmission point TX to the reception point RX under the influence of the obstacles reflecting and scattering the radio wave. Accordingly, the received signal is considered to have a plurality of reception-side phases $\theta$ (hereinafter, called simply reception angles) from the plurality of paths and have a plurality of delay times T from the plurality of paths. Referring to FIG. 2, a plurality of received signals with combinations of unknown reception angles $\theta$ and unknown delay times T is received.

Accordingly, a plurality of reception circuits is included on the receiver R side illustrated in FIG. 1. A first reception circuit R1 has a reception angle $\theta 1$ and a plurality of delay times T (T, 2T, 3T . . . ). An N-th reception circuit RN has a reception angle $\theta N$ and a plurality of delay times T (T, 2T, 3T . . . ). As a result, high-responsivity reception is detected by a combination of a specific reception angle and a specific delay time. The high-responsivity reception may be obtained by a plurality of pairs corresponding to the plurality of paths.

The plurality of prepared reception circuits is basically configured in the same way, and therefore the first reception circuit R1 is described here as an example. First, the reception circuit R1 includes a cosine weighting circuit 13 that assigns a cosine weight to a signal from the first reception antenna AR1, a sine weighting circuit 14 that assigns a sine weight to a signal from the second reception antenna AR2, and a compositor 16 that adds up these signals. In this case, the weight assigned in the reception circuit R1 has the reception angle $\theta 1$. The reception angle $\theta 1$ determining the weight is set in correspondence with a polarization angle specified by a polarization angle control circuit 15 provided in each of the reception circuits.

By the series of process, the signal can be obtained with a high sensitivity in the reception circuit in which there is a match between the actual reception angle and the presumed reception angle of the received signal, and the signal can be obtained with a low sensitivity in the reception circuit in which there is no match between the actual reception angle and the presumed reception angle of the received signal.

Next, the composite output from the compositor 16 is subjected to sliding correlation calculation by a strongly correlated code generated by a strongly correlated code generation circuit 19, a variable delay circuit 18, and a multiplier 17, and a demodulation circuit 20. The strongly correlated code generated by the strongly correlated code generation circuit 19 is basically the same as the strongly correlated code generated by the strongly correlated code generator 5 on the transmission side. Accordingly, the demodulation circuit 20 reproduces the signal at the bit position with the highest correlation. A comparator 21 compares the output of the demodulation circuit 20 with a threshold of each threshold generation circuit 22. A comparison result $\delta$ is input into a baseband circuit 24 and held there.

The output of the multiplier 17 is given different delays by a plurality of delay devices 23 as a cascade circuit. In correspondence with the respective transmission polarization angles $\varphi$ from the transmitter T, a plurality of signals e is input into the baseband circuit 24 at timings shifted from each other at equal intervals.

As described above, the transmitted signal with a rotational polarized wave is subjected to different specific polarization angle shifts through the plurality of different propagation paths caused by the plurality of radio wave scatterers existing between the transmitter and the receiver, and then reaches the receiver. The plurality of received signals having undergone the different polarization angle shifts reaches the receiver and is reproduced by the receiver with the polarization wave rotated at each of the polarization angle shifts. Further the individual reproduced signals are further subjected to different delays T, and are separated and input into the baseband circuit 24.

Accordingly, the input of the baseband circuit 24 includes a signal of correlation comparison result $\delta$, a plurality of timing signals e, and a signal of polarization angle $\theta$ specified by the polarization angle control circuit 15 from each of the reception circuits R. The number of the obtained combinations of these signals corresponds to the number of the reception circuits. These combinations reflect the plurality of different paths P from the transmission point TX to the reception point RX under the influence of the obstacles reflecting and scattering the radio wave. The combination output from the reception circuit with no match with the polarization angle $\theta$ specified by the polarization angle control circuit 15 and the combination output from the reception circuit with a match with the polarization angle $\theta$ specified by the polarization angle control circuit 15 are definitely differentiated.

Using the foregoing results, the baseband circuit 24 can reconstruct by digital signal processing the individual received signals having undergone different polarization shifts using the sum of the signals with different reception polarized waves corresponding to the different transmission polarized waves.

As illustrated in FIG. 1, the calculation of the transmission polarized wave is executed by synchronizing the signal between the transmitter and the receiver using strongly correlated codes with a rotational period of the polarized wave as Tp and then executing nT/Tp (n: integer) using the delay amount T of the delay devices 23 behind the start timing of a specific transmitted signal.

The values of the sum of the signals having undergone the plurality of different polarization angle shifts and received by the receiver R in the different reception polarized waves can be calculated by the two reception antennas AR1 and AR2 orthogonal to each other, the cosine weighting circuit 13, and the sine weighting circuit 14. The values are equal to output $\theta i$ of the polarization angle control circuit controlling the weighting circuits 13 and 14.

The baseband circuit 24 can use these values and the values e of the received signals obtained by the receiver R with the different reception polarized waves to reproduce the individual signals having undergone the different polarization angle shifts by the transmitter through the digital signal processing in accordance with Equation (1) and Equation (2) and having passed through the different propagation paths.

[Equation 1]

$$\delta^i = 0/1, \{\delta^1 \theta_1, \cdots \delta^N \theta_N\} \to 0 \notin \{\theta_1, \cdots \theta_L\}; \quad (1)$$

[Equation 2]

$$[sh_1 \cdots sh_L]^T = \begin{bmatrix} \sin\left(\frac{T}{T_p} - \theta_1\right) & \cdots & \sin\left(\frac{T}{T_p} - \theta_L\right) \\ \vdots & \ddots & \vdots \\ \sin\left(L\frac{T}{T_p} - \theta_1\right) & \cdots & \sin\left(L\frac{T}{T_p} - \theta_L\right) \end{bmatrix}^{-1} \begin{bmatrix} \sum_{k=1}^{L} \frac{e_1^k}{\cos\theta_1} \\ \vdots \\ \sum_{k=1}^{L} \frac{e_L^k}{\cos\theta_L} \end{bmatrix} \quad (2)$$

First, the concept of Equation (1) will be described. The receiver R receives electromagnetic waves at a plurality of polarization angles θ. Although the received waves may be obtained by mechanically rotating the reception antenna AR, they can be electrically obtained by assigning cos and sin weights to the outputs of the two orthogonal antennas AR1 and AR2 at the cosine weighting circuit 13 and the sine weighting circuit 14.

In some cases, signals low in electric intensity and superimposed on the electric waves cannot be restored from the electromagnetic waves having reached at the polarization angles θ. In Equation (1), the weak signals are identified by the use of the correlation comparison results δ. Equation (1) represents the result of multiplication of each of the polarization angles θ by the correlation comparison result δ. The result of the comparison of the received electric intensity with a threshold is "0" in the case where the electric intensity is low, and "1" in the case where the electric intensity is high. Therefore, the radio waves received at the polarization angle θ with the correlation comparison result equivalent to zero are removed. Accordingly, out of the electric waves received at N types of originally different polarization angles, only L (L<N) types of reception radio waves can be used to perform signal processing.

Next, the concept of Equation (2) will be described. By the foregoing process, the receiver R performs the signal processing with a choice of only the received signals corresponding to the N types of polarization angles θ to the L types of polarization angles θ from the correlation comparison results δ.

Here, the mathematical creation of the L types of different transmission paths between the transmitter and the receiver is discussed. First, the transmission polarization angle φ and the reception polarization angle θ can vary independently. Specifically, because of the use of a rotational polarized wave, the transmission polarization angle φ can be taken as L different time points in one period of the rotational polarized wave. This can be achieved by dividing the period into N and multiplying the resultant differences by 1 to L. The reception polarization angle θ can be obtained by assigning the L types of different phase weights to the two orthogonal antennas AR1 and AR2, and therefore all the types of phase weights with the correlation comparison result δ=1 can be used.

Under this condition, the transmitter T transmits the same signal s and the receiver R adds up the signal at the different reception polarization angles and at the L types of different timings (t=T/Tp, 2T/Tp, . . . LT/Tp). Assuming that there are respective specific coefficients hi (i=1, 2, . . . L) for the L types of propagation paths, an equation of the specific coefficients hi for the L types of propagation paths can be created by setting the different added-up signals in correspondence with the same signal.

However, the received signal is the total sum of different times with respect to the reception polarization angles θ. When the phases of the plurality of electromagnetic waves reaching the receiver R are distributed at random, the values of the constant vector in the equation become equal, and the equation for determining the specific coefficients hi for the L types of propagation paths becomes unstable.

To avoid this, some weight is to be applied to the constant vector. In this example, the inverse numbers of cosine values of the reception polarization angles θ are selected. This is because the coefficient matrix of the equation takes on the sine values of differences between the transmission polarization angles θ and the reception polarization angles φ. The use of the sine values is based on the assumption that, at the occurrence of reflection between the transmitter and the receiver, a polarization angle shift takes place, and the shift strongly correlates to the differences between the transmission polarization angles φ and the reception polarization angles θ. Although the sine values are used in this example, the cosine values may be used instead.

The elements of the coefficient matrix are the sine values of the polarization angles, and therefore in the calculation for determining the specific coefficients hi for the L types of propagation paths (the foregoing matrix equation), the elements of the constant vector are multiplied by a function with properties similar to the inverse numbers of the sine values. To reduce variations in the values, the inverse numbers of the cosine values are used as weights assigned to the constant vector. When the elements of the constant vector are the cosine values of the differences between the transmission polarization angles φ and the reception polarization angles θ, the inverse numbers of the sine values are used as weights assigned to the constant vector.

In Equation (2), with the transmission polarization angle φ and the reception polarization angle θ set as variables as described above, the formation of a plurality of virtual propagation paths expressed by the quantitatively calculable coefficients between the transmitter and the receiver is mathematically expressed. By expressing the properties of the propagation paths by the quantitatively calculable coefficients, it is possible to handle the formed propagation paths using the coefficients in a mathematically independent manner, and achieve the plurality of identifiable and selectable propagation paths between the transmitter and the receiver, although in the virtual space.

This digital signal processing includes inverse matrix calculation, and therefore when the condition of the matrix in Equation (2) is not good, the calculation is disabled to make it difficult to reproduce the individual signals through the different propagation paths. The bad condition of the matrix means that there is an attempt to identify propagation paths with similar properties.

This problem can be solved by verifying the properties of the received signals obtained by the receiver with different reception polarized waves and avoiding the use of the received signals with similar properties. When a propagation path experiences some noise or interference, some external disturbance is caused to the strongly correlated code transmitted from the transmitter and the result of correlation calculation with a replica of the strongly correlated code in the receiver varies accordingly. This makes it possible to determine the correlation between the received signals and the strongly correlated codes and identify different propagation paths from the differences in correlation value.

Specifically, the propagation paths different in character to an extent that inverse matrix calculation is enabled are accepted or rejected with a plurality of thresholds predetermined from the calculation results of the correlation values to make it possible to reproduce the individual signals through the different propagation paths.

The signal of the correlation comparison result δ from each of the reception circuits R, the plurality of timing signals e, and the signal of the polarization angle θ specified by the polarization angle control circuit 15 input into the baseband circuit 24 illustrated in FIG. 1 have the respective meanings described below. First, the correlation comparison result δ is an identifiability signal for determining whether the received signal is identifiable or not. The angles φ on the transmission side illustrated in FIG. 2 can be estimated from the plurality of timing signals e. The polarization angle θ is the reception-side polarization angle illustrated in FIG. 2. That is, these signals include the relation in phase between the transmission side and the reception side illustrated in FIG. 2 and the information on whether the reception is enabled or not in the relation.

According to Example 1, it is possible to reproduce the individual signals transferred through the plurality of different propagation paths existing between the transmitter and the receiver for the plurality of propagation paths. This produces the advantage that it is possible to removes or reduces noises and disturbances caused to the signals in a plurality of different places between the transmitter and the receiver to implement high-reliability communications between the transmitter and the receiver.

Example 2

In relation to Example 2, descriptions are given as to another configuration example of a wireless communication system that removes or reduces noises and disturbances caused to signals in a plurality of places between a transmitter and a receiver to implement high-reliability communications between the transmitter and the receiver.

Figure 3:
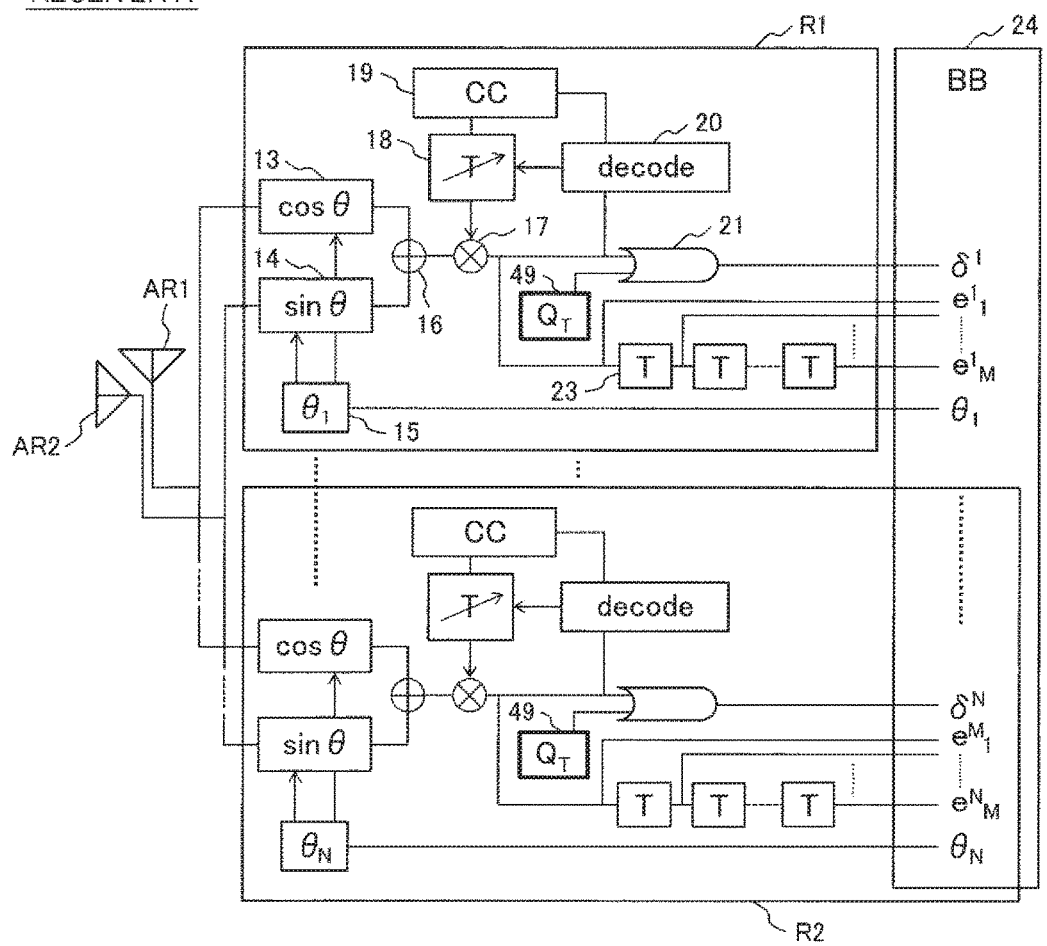
FIG. 3 is a diagram illustrating a configuration example of a receiver in a wireless communication system according to Example 2.

FIG. 3 is a diagram illustrating a configuration example of a receiver in a wireless communication system according to Example 2. The receiver according to Example 2 is different from the receivers R according to Example 1 illustrated in FIG. 1 in that the identification of received signals obtained with different reception polarized waves necessary to perform matrix calculation for reproducing the individual signals through different propagation paths is carried out by the quality of demodulated signals. In Example 1, the received signals are identified by the maximum values of the correlation calculation.

In Example 2 illustrated in FIG. 3, the comparator 21 compares the results of demodulation by the demodulation circuit 20 corresponding to the reception polarized waves to a signal quality threshold generated by a signal quality threshold generation circuit 49 and inputs the same into the baseband circuit 24.

When some noise is added to a propagation path between the transmitter and the receiver, the signal-to-noise ratio of the received signal may significantly degrade even though the calculation result of the correlation value between the received signal and a replica of the strongly correlated signal is not low. According to this example, when the addition of the noise to signals generated in a plurality of different places between the transmitter and the receiver is independent from disturbance, it is possible to improve the effect of enhancing the reliability of communications between the transmitter and the receiver against the addition of the noise.

Example 3

In relation to Example 3, descriptions are given as to another configuration example of a wireless communication system that removes or reduces noises and disturbances caused to signals in a plurality of places between a transmitter and a receiver to implement high-reliability communications between the transmitter and the receiver.

Figure 4:
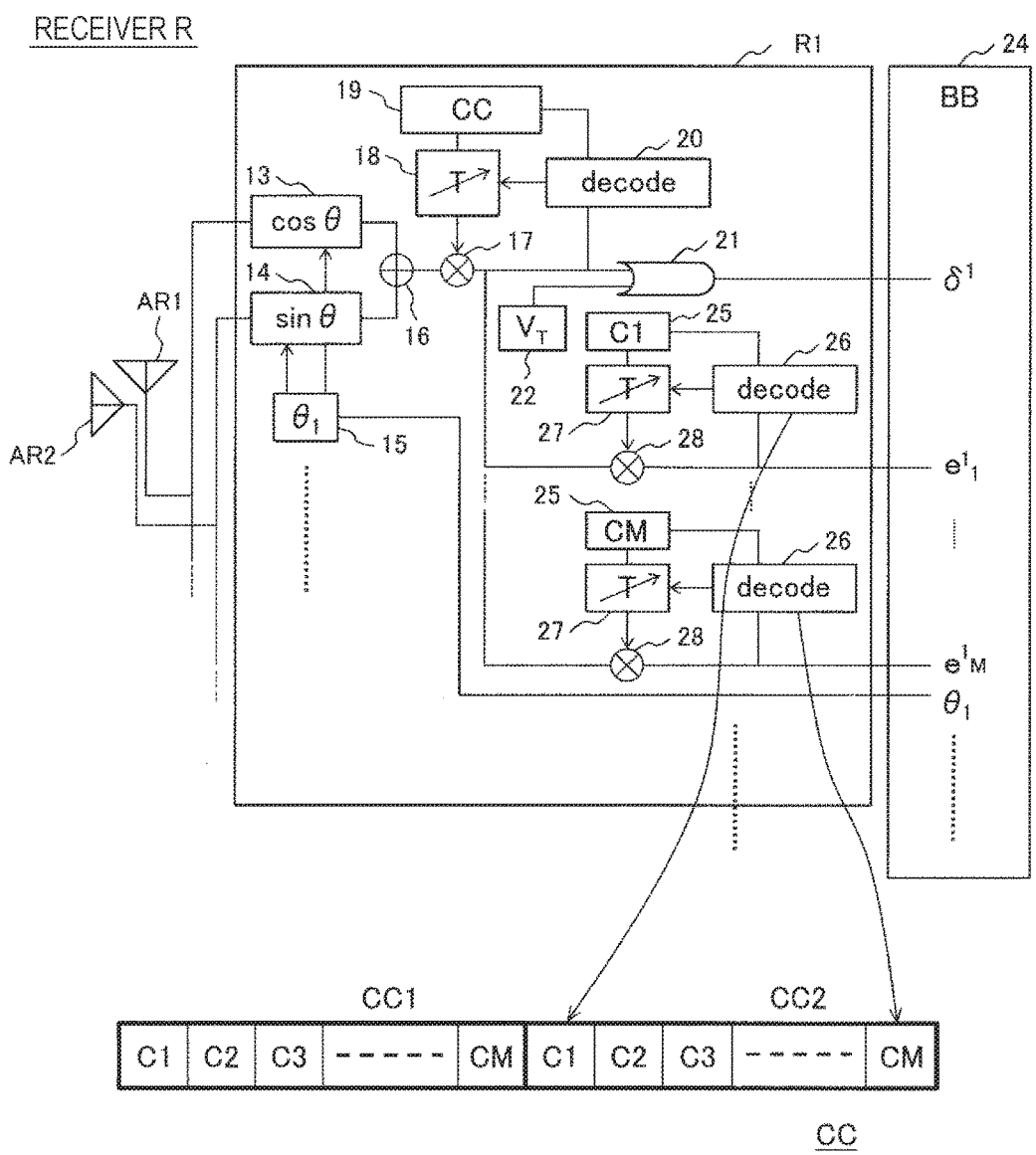
FIG. 4 is a diagram illustrating a configuration example of a receiver in a wireless communication system according to Example 3 and strongly correlated codes.

FIG. 4 is a diagram illustrating a configuration example of a receiver in a wireless communication system according to Example 3 and strongly correlated codes. The receiver according to Example 3 is different from the receiver according to Example 1 illustrated in FIG. 1 in that the strongly correlated codes for use in Example 3 are equally divided and the correlation values between the divided parts are set to be high.

Specifically, the output of the multiplier 17 is branched in the number of divided parts of the strongly correlated codes. Then, for each of the branched parts, a circuit is formed by a strongly correlated code partial code generation circuit 25, a second variable delay circuit 27, a second multiplier 28, and a second demodulation circuit 26. Moreover, the second demodulation circuit 26 for a first branched part is assigned a part C1 of a strongly correlated code CC, and the second demodulation circuit 26 for a second branched part is assigned a part C2 of the strongly correlated code CC.

The branched parts have the same circuit configuration as the circuit configuration of the strongly correlated code generation circuit 19, the variable delay circuit 18, the multiplier 17, and the demodulation circuit 20. This configuration of the branched parts makes it possible to subject the signals received in the respective reception polarized waves to sliding correlation calculation with the respective parts of the strongly correlated codes and the partial codes of the strongly correlated codes to extract the parts of the received signals divided on a time axis and input the same into the baseband circuit 24.

According to Example 3, the transmitter can transmit different information in time domains in which the strongly correlated codes of the transmitted signal are divided, and the receiver can reproduce the information with the signal separated in different times corresponding to the time domains. Accordingly, it is possible to transmit the information multiplied in the different time domains and effectively increase the capacity of information transmission between the transmitter and the receiver and improve the reliability of information transmission between the transmitter and the receiver.

Example 4

In relation to Example 4, descriptions are given as to another configuration example of a wireless communication system that removes or reduces noises and disturbances caused to signals in a plurality of places between a transmitter and a receiver to implement high-reliability communications between the transmitter and the receiver.

Figure 5:
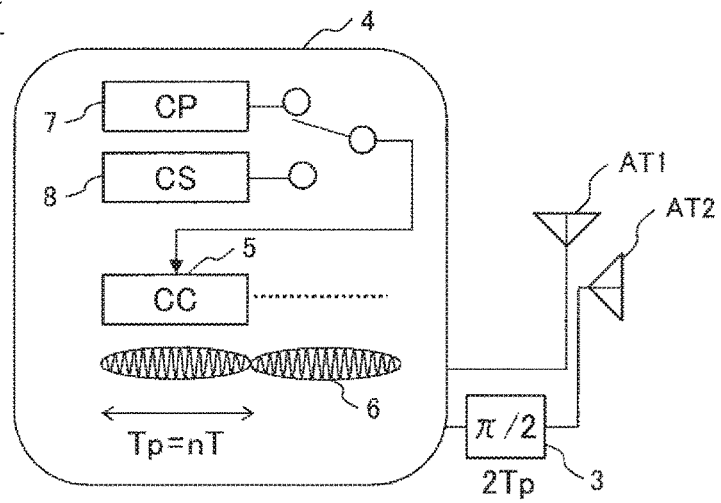
FIG. 5 is a diagram illustrating a configuration example of a transmitter in a wireless communication system according to Example 4.

FIG. 5 is a diagram illustrating a configuration example of a transmitter in a wireless communication system according to Example 4. The transmitter according to Example 4 is different from the transmitter T according to Example 1 illustrated in FIG. 1 in that two kinds of strongly correlated codes CP and CS are used. Referring to FIG. 5, the transmitter includes a synchronization acquiring strongly correlated code generation circuit 7 and a synchronization maintaining strongly correlated code generation circuit 8 to achieve synchronization between the transmitter and the receiver, and these circuits transmit selectively different codes to the strongly correlated code generator 5.

In the case where the motion of an object existing between the transmitter and the receiver and scattering electromagnetic waves is small, there is a high possibility that, once the receiver R acquires synchronization, the synchronization is hardly lost. According to Example 4, in such a situation, the use of a code with a maximum correlation value as a code generated by the synchronization acquiring strongly correlated code generation circuit 7 and a code with any property other than the correlation value, for example, a periodic strongly correlated property as a code generated by the synchronization maintaining strongly correlated code generation circuit 8 makes it possible to add the other function to the communication once the synchronization is acquired.

The configuration of Example 4 illustrated in FIG. 5 is suitable for the case of forming the transmitter by an analog circuit.

Example 5

In relation to Example 5, descriptions are given as to another configuration example of a wireless communication system that removes or reduces noises and disturbances caused to signals in a plurality of places between a transmitter and a receiver to implement high-reliability communications between the transmitter and the receiver.

Figure 6:
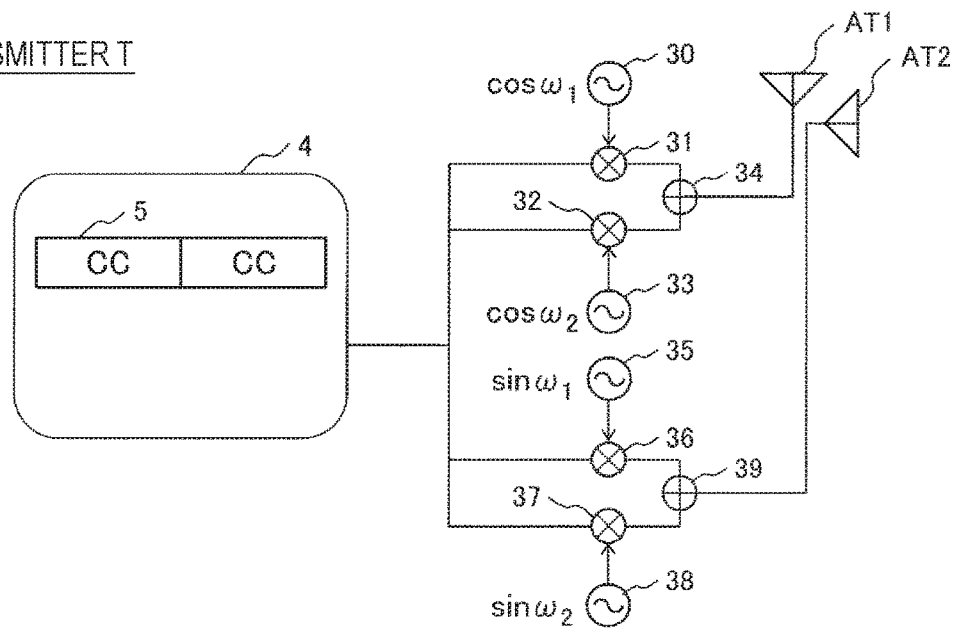
FIG. 6 is a diagram illustrating a configuration example of a transmitter in a wireless communication system according to Example 5.

FIG. 6 is a diagram illustrating a configuration example of a transmitter in a wireless communication system according to Example 5. The transmitter according to Example 5 is different from the transmitter according to Example 1 illustrated in FIG. 1 in the circuit configuration for providing signals with a phase difference of 90 degrees to the orthogonal antennas AT1 and AT2. The signals with a phase difference of 90 degrees are provided by performing a cosine process on the orthogonal antenna AT1 side, and performing a sine process on the orthogonal antenna AT2 side.

In Example 5, the digital signal processing device 4 outputs superimposed signals from the strongly correlated code generator 5 and the digital data generation circuit 11. In this respect, Example 5 is the same as Example 1. The configuration of FIG. 6 includes in subsequent stages, a first frequency cosine transmitter 30, a first frequency sine transmitter 35, a second frequency cosine transmitter 33, a second frequency sine transmitter 38, a first transmission mixer 31, a second transmission mixer 32, a third transmission mixer 36, a fourth transmission mixer 37, a transmission addition circuit 34, and a transmission subtraction circuit 39.

Specifically, the output of the digital signal processing device 4 is divided into four branches. In the first branch, the first transmission mixer 31 multiplies the output of the digital signal processing device 4 by the output of the first frequency cosine transmitter 30. In the second branch, the second transmission mixer 32 multiplies the output of the digital signal processing device 4 by the output of the second frequency cosine transmitter 33. In the third branch, the third transmission mixer 36 multiplies the output of the digital signal processing device 4 by the output of the first frequency sine transmitter 35. In the fourth branch, the fourth transmission mixer 37 multiplies the output of the digital signal processing device 4 by the output of the second frequency sine transmitter 38.

The transmission addition circuit 34 adds up the output of the first transmission mixer 32 and the output of the second transmission mixer 32 and emits the resultant output from the first transmission antenna AT1. The transmission subtraction circuit 39 subtracts the output of the third transmission mixer 36 from the output of the fourth transmission mixer 37 and emits the resultant output from the second transmission antenna AT2.

According to Example 5, the transmission waves with rotational polarization can be achieved by the four transmitters, the four mixers, the addition circuit, and the subtraction circuit. They can be replaced by digital signal processing to effectively reduce the device size and the manufacturing costs.

Example 6

In relation to Example 6, descriptions are given as to another configuration example of a wireless communication system that removes or reduces noises and disturbances caused to signals in a plurality of places between a transmitter and a receiver to implement high-reliability communications between the transmitter and the receiver.

Figure 7:
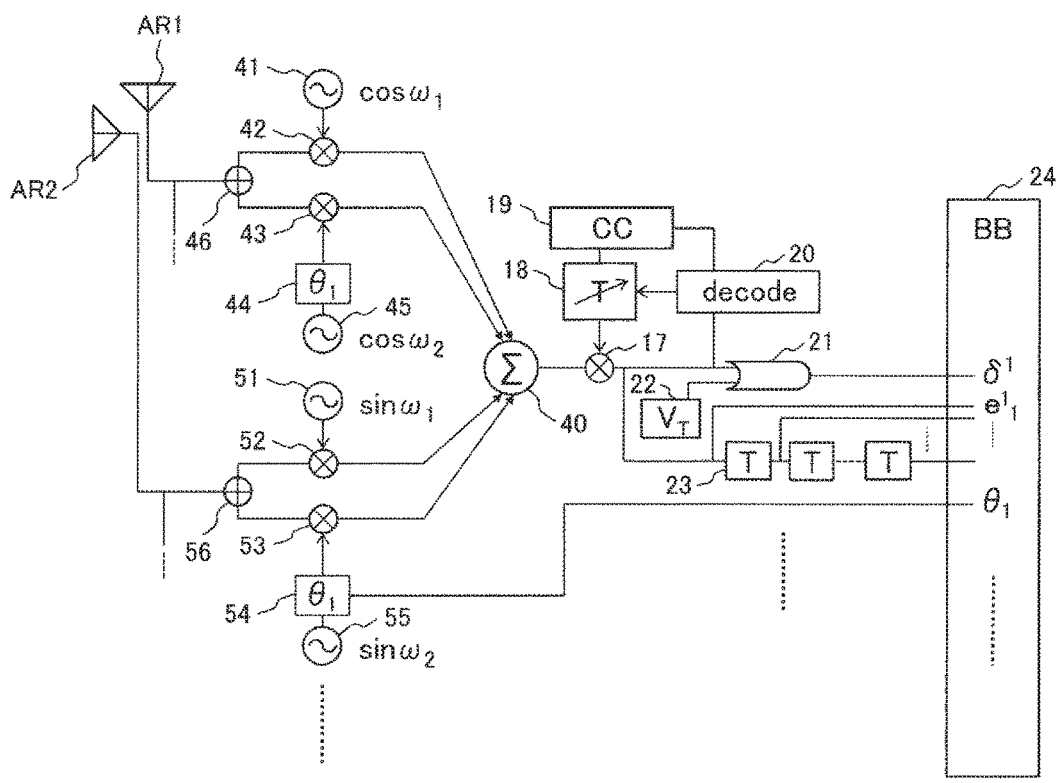
FIG. 7 is a diagram illustrating a configuration example of a receiver in a wireless communication system according to Example 6.

FIG. 7 is a diagram illustrating a configuration example of a transmitter in a wireless communication system according to Example 6. The receiver according to Example 6 is different from Example 1 illustrated in FIG. 1 in that the weighting to the received signal is changed in a more preferable manner.

Instead of the pluralities of cosine weighting circuits 13 and sine weighting circuits 14, polarization angle control circuits 15, and compositors 16, Example 6 includes a first frequency cosine local transmitter 41, a first frequency sine local transmitter 51, a second frequency cosine local transmitter 45, a second frequency sine local transmitter 55, a first reception mixer 42, a second reception mixer 43, a third reception mixer 52, a fourth reception mixer 53, an addition distribution circuit 46, a subtraction distribution circuit 56, a cosine phase shift circuit 44, a sine phase shift circuit 54, and a summation circuit 40.

The signal received by the first transmission antenna AR1 is divided by the addition distribution circuit 46 into two branches in the same phase. The first reception mixer 42 multiplies one of the branches by the output of the first frequency cosine local transmitter 41, and the second reception mixer 43 multiplies the other branch by the output of the second frequency cosine local transmitter 45 via the cosine phase shift circuit 44, and the two branches constitute the input to the summation circuit 44.

Similarly, the signal received by the second transmission antenna AR2 is divided by the subtraction distribution circuit 56 into two branches in opposite phases. The third reception mixer 52 multiplies one of the branches by the output of the first frequency sine local transmitter 51, and the fourth reception mixer 53 multiplies the other branch by the output of the second frequency sine local transmitter 55 via the sine phase shift circuit 54, and the two branches constitute the input to the summation circuit 44. The output of the summation circuit 44 constitutes the input to the multiplier 17, and the sine phase shift circuit 54 inputs the amount of phase shift into the baseband circuit 24. A plurality of the foregoing configurations is installed in parallel depending on different phase shift amounts as in Example 1 of FIG. 1.

According to Example 5, the function of the receiver in Example 1 of FIG. 1 can be implemented without the cosine weighting circuit and the sine weighting circuit. This effectively solves the problem of degradation in accuracy of polarization angles of the reception polarized wave due to an unbalance between the amounts of weighting by the two weighting circuits, and facilitates identification of different propagation paths using the difference between the polarization angles of the received signal.

Example 7

In relation to Example 7, descriptions are given as to another configuration example of a wireless communication system that removes or reduces noises and disturbances caused to signals in a plurality of places between a transmitter and a receiver to implement high-reliability communications between the transmitter and the receiver.

Figure 8:
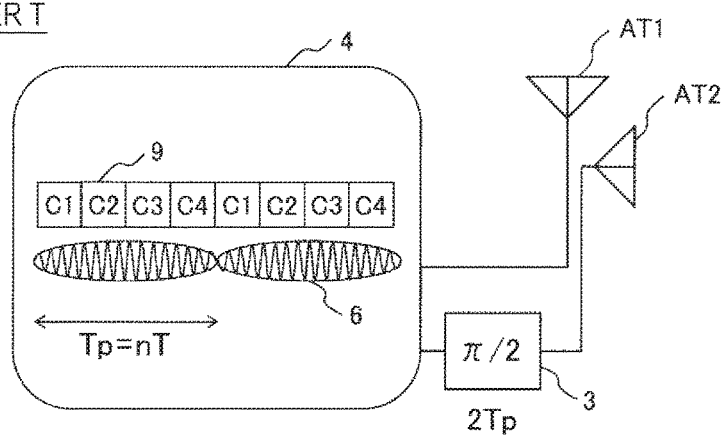
FIG. 8 is a diagram illustrating a configuration example of a transmitter in a wireless communication system according to Example 7.

FIG. 8 is a diagram illustrating a configuration example of a transmitter in a wireless communication system according to Example 7. The transmitter according to Example 7 is different from the transmitter according to Example 1 of FIG. 1 in that the strongly correlated code for use in Example 7 is equally divided and the correlation values between the divided portions (C1, C2, C3, and C4) are set to be high.

According to Example 7, the transmitter can transmit different information in time domains in which the strongly correlated codes of the transmitted signal are divided, and the receiver can reproduce the information with the signal separated in different times corresponding to the time domains. Accordingly, it is possible to transmit the information multiplied in the different time domains and effectively increase the capacity of information transmission between the transmitter and the receiver and improve the reliability of information transmission between the transmitter and the receiver.

Example 8

In relation to Example 8, descriptions are given as to another configuration example of a wireless communication system that removes or reduces noises and disturbances caused to signals in a plurality of places between a transmitter and a receiver to implement high-reliability communications between the transmitter and the receiver.

Figure 9:
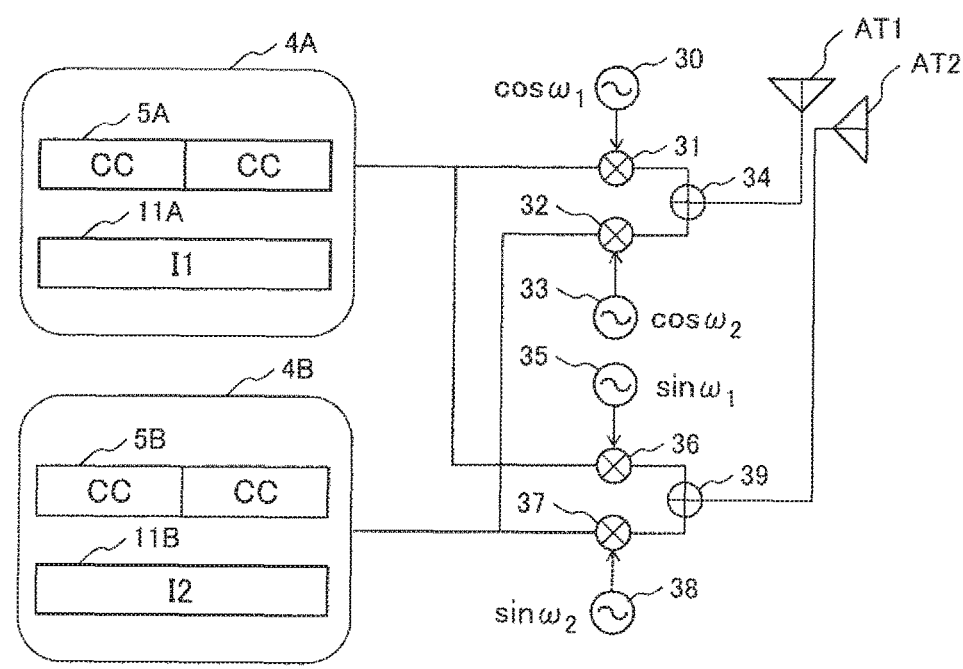
FIG. 9 is a diagram illustrating a configuration example of a transmitter in a wireless communication system according to Example 8.

FIG. 9 is a diagram illustrating a configuration example of a transmitter in a wireless communication system according to Example 8. The transmitter according to Example 8 is different from the transmitter according to Example 5 illustrated in FIG. 6 in that the digital signal processing device 4 is divided into two branches 4A and 4B.

The first digital signal processing device 4A outputs superimposed signals from a first strongly correlated code generator 5A and a first digital data generation circuit 11A, and the second digital signal processing device 4B outputs superimposed signals from a second strongly correlated code generator 5B and a second digital data generation circuit 11B.

In addition, as a circuit configuration for providing the outputs from the two branches 4A and 4B of the digital signal processing device 4 as signals with a phase difference of 90 degrees to the orthogonal antennas AT1 and AT2, the following configuration is employed. Specifically, the configuration includes a first frequency cosine transmitter 30, a first frequency sine transmitter 35, a second frequency cosine transmitter 33, a second frequency sine transmitter 38, a first transmission mixer 31, a second transmission mixer 32, a third transmission mixer 36, a fourth transmission mixer 37, a transmission addition circuit 34, and a transmission subtraction circuit 39.

In this circuit configuration, the output of the first digital signal processing device 4A is divided into two branches. In one of the branches, the first transmission mixer 31 multiplies the output of the first digital signal processing device 4A by the output of the first frequency cosine transmitter 30. In the other branch, the third transmission mixer 36 multiplies the output of the first digital signal processing device 4A by the output of the first frequency sine transmitter 35.

In addition, the output of the second digital signal processing device 4B is divided into two branches. In one of the branches, the second transmission mixer 32 multiplies the output of the second digital signal processing device 4B by the output of the second frequency cosine transmitter 33. In the other branch, the fourth transmission mixer 37 multiplies the output of the second digital signal processing device 4B by the output of the second frequency sine transmitter 38.

After that, the transmission addition circuit 34 adds up the output of the first transmission mixer 31 and the output of the second transmission mixer 32 and emits the resultant output from the first transmission antenna AT1. The transmission subtraction circuit 39 subtracts the output of the third transmission mixer 36 from the output of the fourth transmission mixer 37 and emits the resultant output from the second transmission antenna AT2.

According to this example, it is possible to modulate signals of two frequencies constituting the transmission waves with rotational polarization by different digital data and transmit the signals, which is effective in redoubling the capacity of communication or the reliability of communication between the transmitter and the receiver.

Example 9

In Example 9, descriptions are given as to another configuration example of a wireless communication system that removes or reduces noises and disturbances caused to signals in a plurality of places between a transmitter and a receiver to implement high-reliability communications between the transmitter and the receiver.

Figure 10:
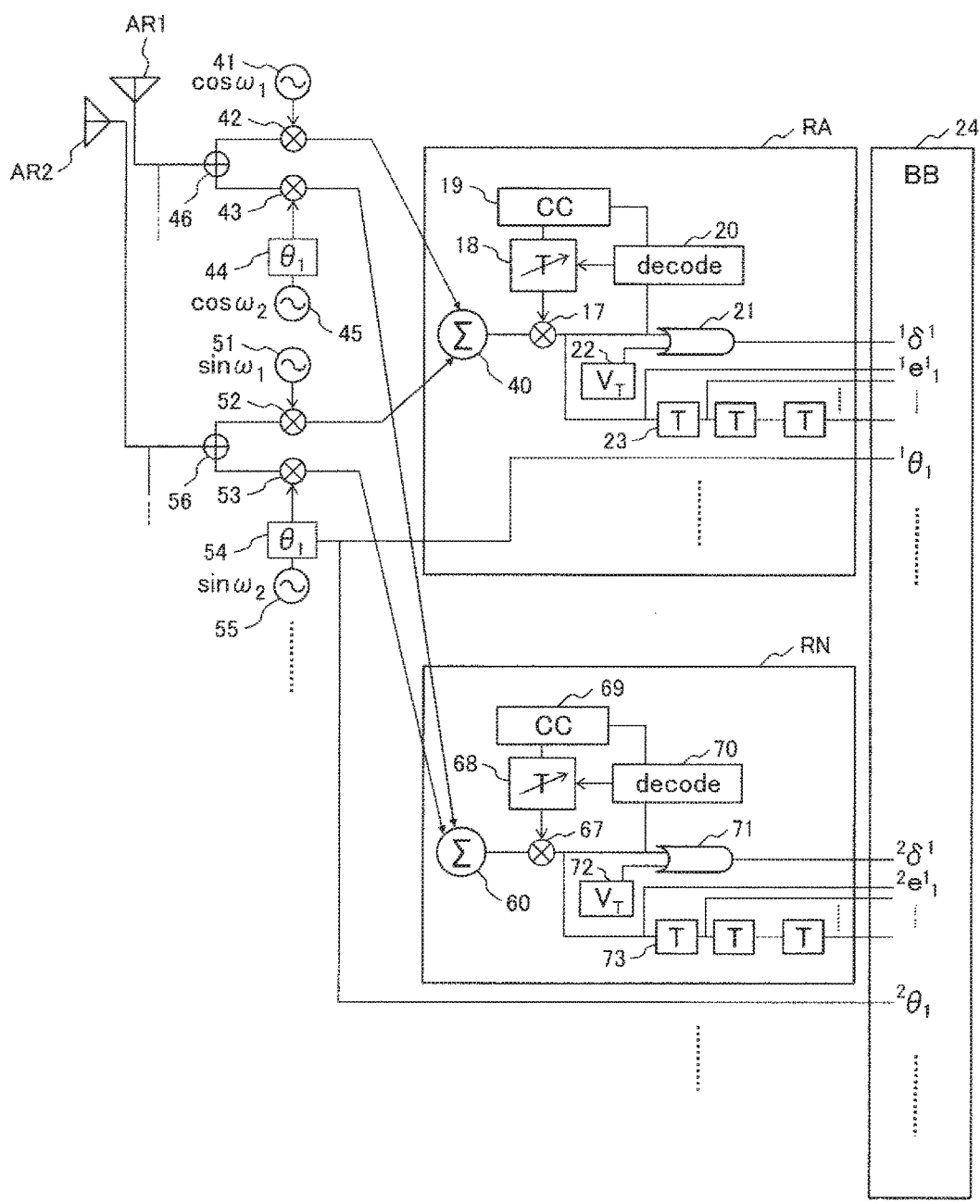
FIG. 10 is a diagram illustrating a configuration example of a receiver in a wireless communication system according to Example 9.

FIG. 10 is a diagram illustrating a configuration example of a receiver in a wireless communication system according to Example 9. The receivers according to Example 9 are different from the receiver according to Example 6 illustrated in FIG. 7 in that a plurality of reception circuit units RN similar in configuration to a reception circuit unit RA (constitutional element including the multiplier 17, the strongly correlated code generation circuit 19, the variable delay circuit 18, the demodulation circuit 20, the comparator 21, the threshold generation circuit 22, the delay devices 23, and the summation circuit 40) is additionally installed. The additionally installed reception circuit units RN include a second multiplier 67, a second strongly correlated code generation circuit 69, a second variable delay circuit 68, a second demodulation circuit 70, a second comparator 71, a second threshold generation circuit 72, a second delay device 73, and a second summation circuit 60.

In the additionally installed reception circuit units RN, the output of the first reception mixer 42 and the output of the third reception mixer 52 constitute the input to the summation circuit 40, the output of the second reception mixer 43 and the output of the fourth reception mixer 53 constitute the input to the second summation circuit 60, and the output of the summation circuit and the phase shift amount in the sine phase shift circuit 54 constitute the input to the baseband circuit 24.

According to Example 9, it is possible to extract individually information included in the two different frequency components transmitted by electromagnetic waves including the two frequency components with rotational polarization by the means described above in relation to Example 6 illustrated in FIG. 7. This effectively redoubles the capacity of communication and the reliability of communication between the transmitter and the receiver.

Example 10

In Example 10, descriptions are given as to another configuration example of a wireless communication system that removes or reduces noises and disturbances caused to signals in a plurality of places between a transmitter and a receiver to implement high-reliability communications between the transmitter and the receiver.

Figure 11:
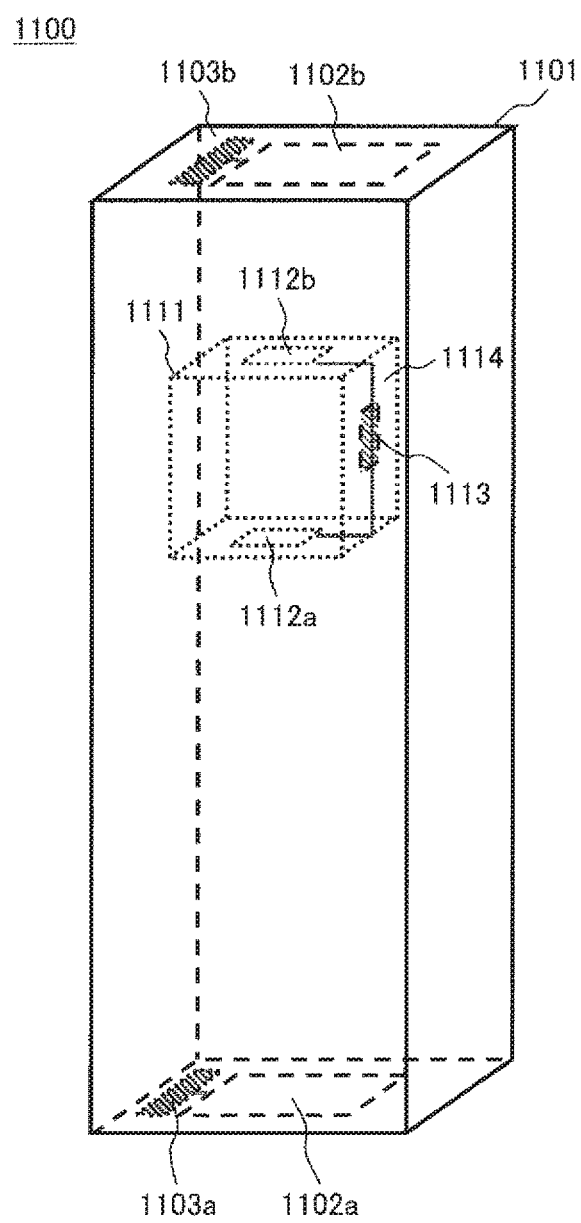
FIG. 11 is a diagram illustrating a configuration example of an elevator system to which a wireless communication system according to example 10 is applied.

FIG. 11 is a diagram illustrating a configuration example of an elevator system to which a wireless communication system according to Example 10 is applied. In the elevator system 1100 according to Example 10, an elevating cage 1111 elevates and descends in a building 1101 in which the elevator is installed. At a floor section and a ceiling section in the building 1101, base station radios 1103 including the transmitter and the receiver in the wireless communication system and base station two-orthogonal polarized wave integrated antennas 1102 are installed in a coupled state.

In addition, at the external ceiling and the external floor surface of the elevating cage 1111, terminal station two-orthogonal polarized wave integrated antennas 1112 including the transmitter and the receiver in the wireless communication system are installed and coupled to a terminal radio 1113 via a high-frequency cable 1114.

The wireless communication in the elevator system is carried out in an environment in which the space in a building is used to communicate with a moving object. The base station radio 1103 and the terminal station radio 1113 use the interior of the building 1101 as a wireless transmission medium, and the electromagnetic waves are subjected to multiple reflection by the inner walls of the building 1101 and the outer walls of the elevating machine, thereby forming a multiple wave interference environment.

According to the base station including the transmitter and the receiver in the wireless communication system of the present invention, it is possible to implement high-quality wireless transmission in which the action of changing the propagation path by an outsider is detected and reduction in the quality of communication between the transmitter and the receiver due to the change is compensated for. Accordingly, the elevating cage 1111 can be controlled and monitored remotely using the wireless connection means with the radios, without the use of a wired connection means from the building 1101. As a result, it is possible to eliminate a wired connection means such as a cable, and achieve the same carrying capacity with a smaller building volume or improve the carrying capacity with an increase in the dimensions of the elevator with the same building volume.

Example 11

In Example 11, descriptions are given as to another configuration example of a wireless communication system that removes or reduces noises and disturbances caused to signals in a plurality of places between a transmitter and a receiver to implement high-reliability communications between the transmitter and the receiver.

Figure 12:
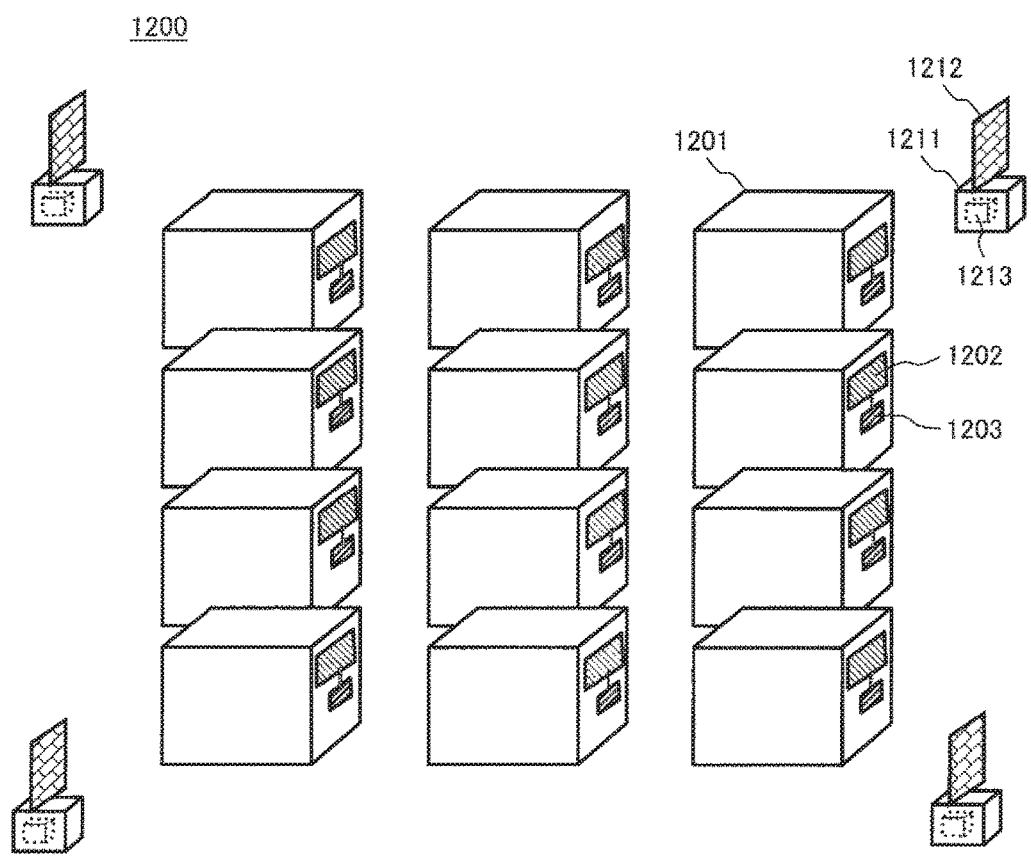
FIG. 12 is a diagram illustrating a configuration example of an electric substation facility monitoring system to which a wireless communication system according to example 11 is applied.

FIG. 12 is a diagram illustrating a configuration example of an electric substation facility monitoring system to which radios including the transmitter and the receiver in the wireless communication system according to example 11 are applied.

An electric substation facility monitoring system 1200 includes a plurality of substation machines 1201. Each of the substation machines 1201 has a terminal station radio 1203 including the transmitter and the receiver in the wireless communication system of the present invention and terminal station two-orthogonal polarized wave integrated antenna 1202 installed in a coupled state. In addition, a smaller number of base station devices 1211 including the transmitter and the receiver in the wireless communication system than the number of the substation machines 1201 are installed near the plurality of substation machines 1201. Each of the base station devices 1211 has a base station radio 1213 and a base station two-orthogonal polarized wave integrated antenna 1212 installed in a coupled state.

In this case, the size of the substation machine is of the order of several meters and is far larger than the wavelengths corresponding to several hundred MHz to several GHz as frequencies of the electromagnetic waves used by the radios. Accordingly, the electromagnetic waves are subjected to multiple reflection by the plurality of substation machines 1201 to form a multiple wave interference environment.

In Example 11, it is possible to implement high-quality wireless transmission in which the action of changing the propagation path by an outsider is detected and reduction in the quality of communication between the transmitter and the receiver due to the change is compensated for under the multiple wave interference environment. Accordingly, the substation machines 1201 can be controlled and monitored remotely using the wireless connection means with the radios, without the use of a wired connection means by the plurality of base station devices 1211. As a result, it is possible to solve a problem of high-pressure inductive power in the case of using a wired connection means such as cables and reduce the cost for laying the cables, and effectively improve the safety of the control and monitoring system of the substation machines 1201 and reduce the costs for the same.

According to the present invention described above, the transmitter superimposes a strongly correlated code with the same rotational period as that of an electromagnetic wave with rotational polarization on the electromagnetic wave, and modulates the signal to the code and transmits the same, and the receiver receives the signal including a replica of a strongly correlated signal with rotational polarization, separates a plurality of signals for each of the polarized waves transmitted from the transmitter with synchronization between the transmitter and the receiver by the strongly correlated code, calculates the correlation between the received signal and the strongly correlated signal for each of the polarized waves to obtain correlation values, compares the correlation values with a preset threshold to obtain comparison values, selects the reception wave for each of the polarized waves using the comparison values, and demodulates the signals from the selected reception waves.

The transmitter transmits signals using rotational polarized waves, and the signals are subjected to multiple reflection by structures as a plurality of radio wave scatterers existing between the transmitter and the receiver, and then are subjected to shifts at different polarization angles through different paths, and reach the receiver.

Accordingly, the receiver can recognize at what timing and at which of the polarization angles the transmitter transmitted the signals by the use of the strongly correlated code, and separate the received signals corresponding to the same transmission polarized wave into the received signals having been subjected to different polarization angle shifts at the same time.

The reception quality of the separated signals can be determined by the correlation calculation between the received signals and the strongly correlated signals, and the received signals separated by reception quality can be grouped. The receiver can select the grouped received signals or composite the same with an appropriate weight to implement high-reliability communication in which there exists a plurality of propagation paths between the transmitter and the receiver and the propagation paths are selected or composited for communication.

REFERENCE SIGNS LIST 101 first transmission antenna (AT1)
102 second transmission antenna (AT2)
3 beat frequency 90-degree phase shift circuit
4 digital signal processing device
5 strongly correlated code generator
6 beat waveform generator
7 synchronization acquiring strongly correlated code generator
8 synchronization maintaining strongly correlated code generator
201 first reception antenna (AR1)
202 second reception antenna (AR2)
13 cosine weighting circuit
14 sine weighting circuit
15 polarization angle control circuit
16 compositor
17 multiplier
18 variable delay circuit
19 strongly correlated code generation circuit
20 demodulation circuit
21 comparator
22 threshold generation circuit
23 delay device
24 baseband circuit
25 strongly correlated code partial code generation circuit
26 second demodulation circuit
27 second variable delay circuit
28 second multiplier
30 first frequency cosine transmitter
31 first transmission mixer
32 second transmission mixer
33 second frequency cosine transmitter
34 transmission addition circuit
35 first frequency sine transmitter
36 third transmission mixer
37 fourth transmission mixer
38 second frequency sine transmitter
39 transmission subtraction circuit
40 summation circuit
41 first frequency cosine local transmitter
42 first reception mixer
43 second reception mixer
44 cosine phase shift circuit
45 second frequency cosine local transmitter
46 addition distribution circuit
51 first frequency sine local transmitter
52 third reception mixer
53 fourth reception mixer
54 sine phase shift circuit
55 second frequency sine local transmitter
56 subtraction distribution circuit
60 second summation circuit
61 strongly correlated code generator
62 first digital data generation circuit (5A)
63 first digital signal processing device (4A)
64 strongly correlated code generator (5B)
65 second digital data generation circuit (11B)
66 second digital signal processing device (4b)
67 multiplier
68 variable delay circuit
69 strongly correlated code generation circuit
70 demodulation circuit
71 comparator
72 threshold generation circuit
73 delay device
1100 elevator system
1101 building
1111 elevating cage
1103 base station radio
1102 base station two-orthogonal polarized wave integrated antenna
1112 terminal station two-orthogonal polarized wave integrated antenna
1114 high-frequency cable
1113 terminal radio
1200 electric substation facility monitoring system
1201 substation machine
1203 terminal station radio
1202 terminal station two-orthogonal polarized wave integrated antenna
1211 base station device
1213 base station radio
1212 base station two-orthogonal polarized wave integrated antenna

The invention claimed is:

1. A wireless communication system comprising:
a transmitter that transmits a carrier wave with rotational polarization on which a strongly correlated code is superimposed; and
a receiver that uses the strongly correlated code in the reception polarized wave from the transmitter to establish synchronization between the transmitter and the receiver, wherein
the receiver receives signals in a plurality of different polarized waves, establishes synchronization between the transmitter and the receiver for the plurality of reception polarized waves using correlation values between the received signals and the strongly correlated code corresponding to the reception polarized waves, compares the correlation values to a threshold to extract a specific reception polarized wave and a received signal corresponding to the polarized wave, calculates transmission polarization angles from shifts in synchronization timing, and separates or selects the signals transmitted in different propagation paths using specific reception polarized waves corresponding to the plurality of transmission polarization angles and the received signals corresponding to the polarized waves.

2. The wireless communication system according to claim 1, wherein the transmitter includes a plurality of different strongly correlated codes and performs communications while switching between the strongly correlated codes at different transmission timings.

3. The wireless communication system according to claim 1, wherein the strongly correlated code in the transmitter has periodicity, and the period and the rotational period of polarization of the carrier wave are identical.

4. The wireless communication system according to claim 1, wherein the strongly correlated code in the transmitter is divided at equal time intervals and partial codes of the divided strongly correlated code have mutually strong correlation.

5. The wireless communication system according to claim 1, wherein the transmitter divides the rotational period of polarization of the carrier wave and transmits divisional information at different time intervals in the same direction of polarization.

6. The wireless communication system according to claim 1, wherein the transmitter adds up carrier waves of two different frequencies to form a beat signal, and emits the same to the space in a spatially orthogonal manner with a shift of ¼ from a beat period.

7. The wireless communication system according to claim 1, wherein the transmitter uses total four carrier waves including sine waves and cosine waves of two different frequencies to composite cosine waves of different frequencies in phase and emit the composite wave from a first transmission antenna, and composite sine waves of different frequencies in opposite phase and emit the composite wave from a second transmission antenna spatially orthogonal to the first transmission antenna.

8. The wireless communication system according to claim 6, wherein the transmitter communicates different information at two different frequencies.

9. The wireless communication system according to claim 1, wherein there is a relation in monotonic decrease among the frequency of the carrier wave, the frequency of rotation of polarization, and the frequency of information to be transmitted.

10. An elevator control system to which the wireless communication system according to claim 1 is applied.

11. An electric substation system to which the wireless communication system according to claim 1 is applied.

12. The wireless communication system according to claim 7, wherein the transmitter communicates different information at two different frequencies.

13. The wireless communication system according to claim 7, wherein the transmitter communicates different information at two different frequencies.

14. A wireless communication system comprising:
a transmitter that transmits a carrier wave with rotational polarization on which a strongly correlated code is superimposed; and
a receiver that uses the strongly correlated code in the reception polarized wave from the transmitter to establish synchronization between the transmitter and the receiver, wherein,
the receiver receives signals in a plurality of different polarized waves, establishes synchronization for the plurality of reception polarized waves between the transmitter and the receiver using correlation values between the received signals and the strongly correlated code corresponding to the reception polarized waves, compares the quality of the received signals corresponding to the reception polarized waves to a threshold to extract a specific reception polarized wave and a received signal corresponding to the polarized wave, calculates transmission polarization angles from shifts in synchronization timing, and separates or selects the signals transmitted in different propagation paths using specific reception polarized waves corresponding to the plurality of transmission polarization angles and the received signals corresponding to the polarized waves.

15. The wireless communication system according to claim 14, wherein the transmitter includes a plurality of different strongly correlated codes and performs communications while switching between the strongly correlated codes at different transmission timings.

16. The wireless communication system according to claim 14, wherein the strongly correlated code in the transmitter has periodicity, and the period and the rotational period of polarization of the carrier wave are identical.

17. The wireless communication system according to claim 14, wherein the strongly correlated code in the transmitter is divided at equal time intervals and partial codes of the divided strongly correlated code have mutually strong correlation.

18. The wireless communication system according to claim 14, wherein the transmitter divides the rotational period of polarization of the carrier wave and transmits divisional information at different time intervals in the same direction of polarization.

19. The wireless communication system according to claim 14, wherein the transmitter adds up carrier waves of two different frequencies to form a beat signal, and emits the same to the space in a spatially orthogonal manner with a shift of ¼ from a beat period.

20. The wireless communication system according to claim 14, wherein the transmitter uses total four carrier waves including sine waves and cosine waves of two different frequencies to composite cosine waves of different frequencies in phase and emit the composite wave from a first transmission antenna, and composite sine waves of different frequencies in opposite phase and emit the composite wave from a second transmission antenna spatially orthogonal to the first transmission antenna.

21. The wireless communication system according to claim 14, wherein there is a relation in monotonic decrease among the frequency of the carrier wave, the frequency of rotation of polarization, and the frequency of information to be transmitted.

22. A wireless communication system comprising:
a transmitter that transmits a carrier wave with rotational polarization on which a strongly correlated code is superimposed; and
a receiver that uses the strongly correlated code in the reception polarized wave from the transmitter to establish synchronization between the transmitter and the receiver, wherein, the receiver includes a plurality of reception circuits and a processing circuit that performs signal processing using detection signals from the plurality of reception circuits, the plurality of reception circuits includes reception units that receive reception polarized waves at different polarization angles and delay time holding units that have a plurality of different delay times, and the processing circuit performs signal processing using information on the synchronization, the delay time, and the polarization angle obtained from the plurality of reception circuits.

\* \* \* \* \*